United States Patent
El-Refaie et al.

(10) Patent No.: US 8,229,682 B2
(45) Date of Patent: Jul. 24, 2012

(54) APPARATUS AND METHOD FOR BEARING CONDITION MONITORING

(75) Inventors: Ayman Mohamed Fawzi El-Refaie, Niskayuna, NY (US); Robert Dean King, Schenectady, NY (US); Christof Martin Sihler, Hallbergmoos (DE)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 12/542,046

(22) Filed: Aug. 17, 2009

(65) Prior Publication Data

US 2011/0040495 A1     Feb. 17, 2011

(51) Int. Cl.
*G01M 13/04* (2006.01)
*G06F 19/00* (2011.01)

(52) U.S. Cl. ......... 702/34; 73/865.8; 324/263; 384/29; 384/49; 384/51; 384/91; 702/182; 702/183

(58) Field of Classification Search ........... 73/66, 432.1, 73/455, 457, 865.8, 865.9; 318/491; 324/200, 324/260, 262, 263, 500, 540, 679, 682, 870.01, 324/870.07, 870.16; 384/7, 26, 29, 49, 50, 384/52, 55, 91; 702/1, 33, 34, 35, 38, 57, 702/127, 182, 183, 187, 189; 708/100, 105, 708/131, 160, 200

See application file for complete search history.

(56) References Cited

U.S. PATENT DOCUMENTS

| | | | |
|---|---|---|---|
| 2,439,035 A * | 4/1948 | Bidwell et al. ........... 73/7 |
| 2,468,509 A * | 4/1949 | Naab .................. 340/682 |
| 2,538,790 A * | 1/1951 | Merrill ................. 73/9 |
| 2,883,255 A * | 4/1959 | Anderson ............... 346/34 |
| 3,108,264 A * | 10/1963 | Heinoo ................. 340/682 |
| 3,155,956 A * | 11/1964 | Hornbostel, Jr. et al. ..... 340/608 |
| 3,183,500 A * | 5/1965 | Hornbostel, Jr. et al. ..... 340/631 |
| 3,201,996 A * | 8/1965 | Silvia ................. 73/865.9 |
| 3,373,300 A * | 3/1968 | Sullivan ............... 310/68 R |
| 3,508,241 A * | 4/1970 | Potter ................. 340/682 |
| 5,336,996 A * | 8/1994 | Rusnak ................ 324/207.2 |
| 6,043,643 A * | 3/2000 | Message et al. ......... 324/174 |
| 6,100,809 A * | 8/2000 | Novoselsky et al. ...... 340/682 |
| 7,243,557 B2 | 7/2007 | May |
| 7,606,673 B2 * | 10/2009 | Judd ................... 702/56 |
| 2009/0093975 A1 * | 4/2009 | Judd ................... 702/34 |
| 2010/0172605 A1 * | 7/2010 | Pausch et al. .......... 384/446 |

FOREIGN PATENT DOCUMENTS

JP     2011-039056 A  *  2/2011

OTHER PUBLICATIONS

"Bearing Currents in Modern AC Drive Systems," Technical Guide No. 5, ABB Automation Group Ltd., 1999.

(Continued)

*Primary Examiner* — Edward Cosimano
(74) *Attorney, Agent, or Firm* — Ziolkowski Patent Solutions Group, SC; Jean K. Testa

(57) ABSTRACT

An electrical motor bearing condition monitoring system includes an assembly that includes a shaft, a first bearing race coupled to the shaft, a plurality of bearing balls, and a second bearing race coupled to the first bearing race via the plurality of bearing balls. A portion of the assembly has a magnetic field encoded thereon. The monitoring system includes a magnetic field sensor positioned proximately to the magnetized assembly and configured to measure the magnetic field, and a processing unit configured to detect changes in the magnetic field via the magnetic field sensor.

25 Claims, 6 Drawing Sheets

OTHER PUBLICATIONS

"Inverter-Driven Induction Motors Shaft and Bearing Current Solutions," Baldor Electric Company.

Erdman et al., "Effect of PWM Inverters on AC Motor Bearing Currents and Shaft Voltages", IEEE Transactions on Industry Applications, vol. 32, No. 2, Mar./Apr. 1996, pp. 250-259.

* cited by examiner

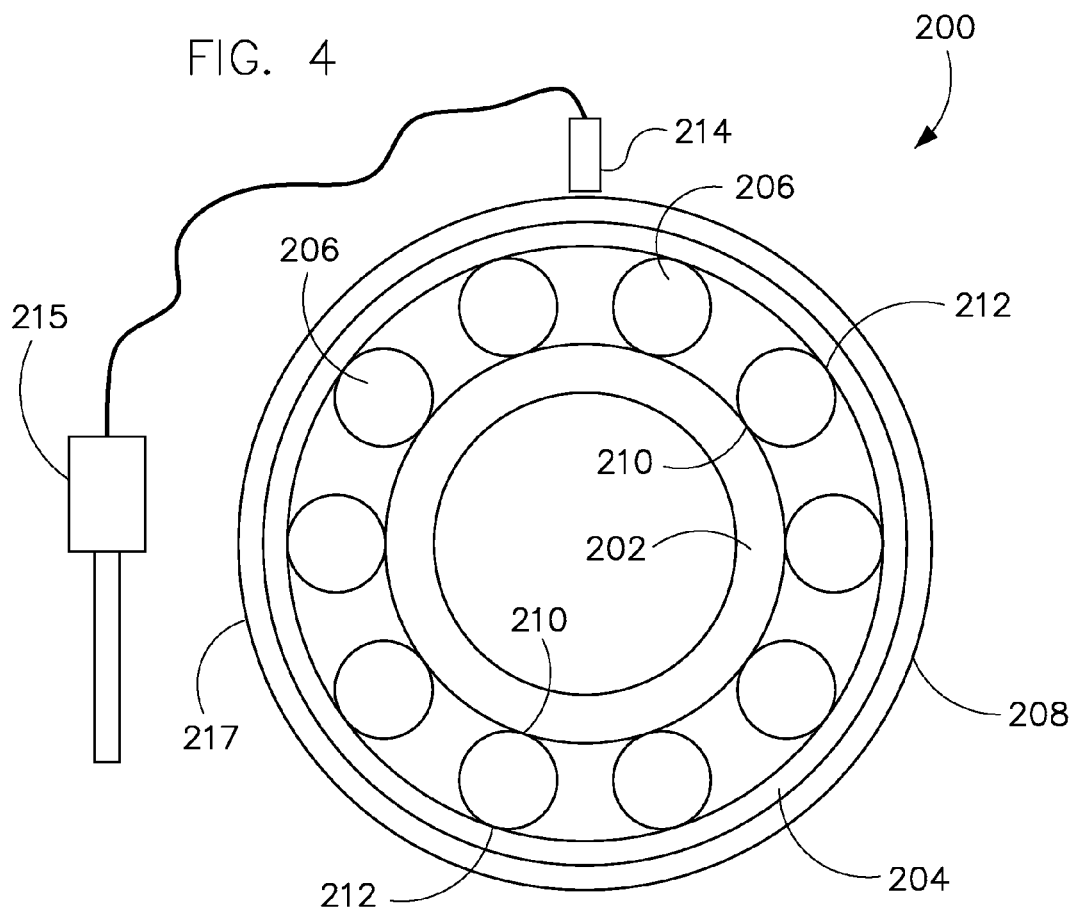
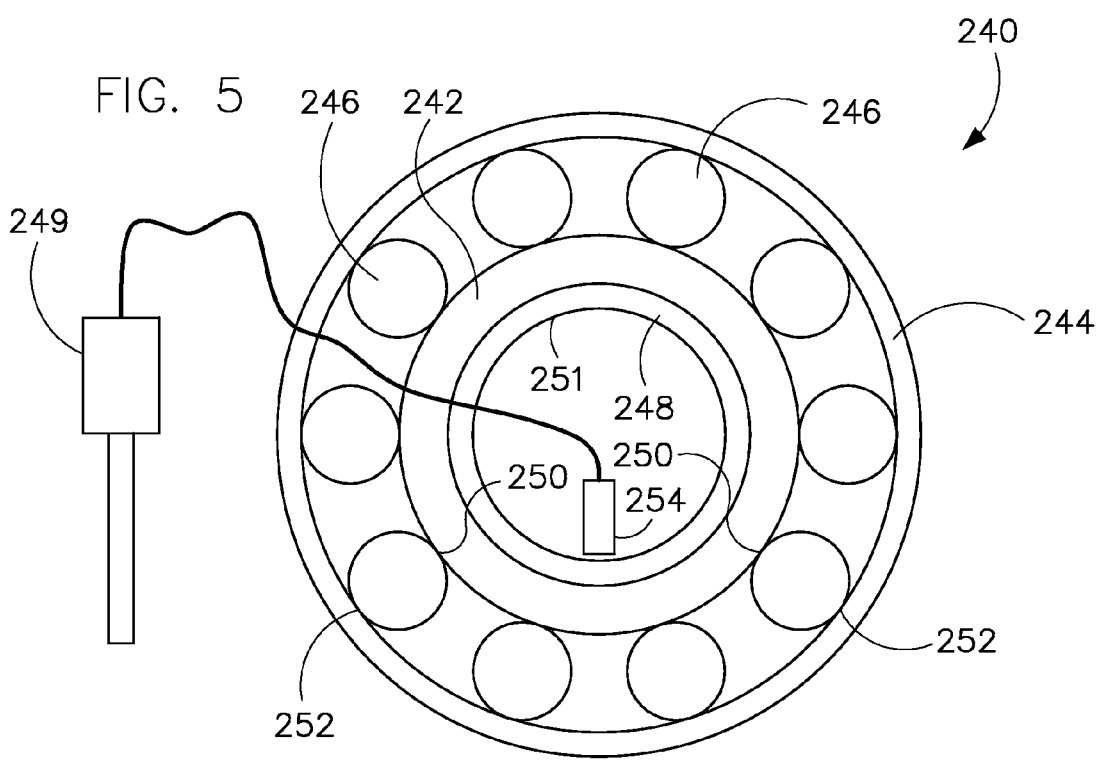

APPARATUS AND METHOD FOR BEARING CONDITION MONITORING

BACKGROUND

The invention relates generally to bearing currents and, more specifically, to a system and method of monitoring a condition of a bearing.

Rotating machines such as electrical motors typically include bearings that support a shaft, and such rotating machines are typically susceptible to abnormal bearing wear due to bearing current. Typically, rotating machines may be susceptible to various known sources of shaft voltage that can lead to bearing currents such as electromagnetic induction, electrostatic coupling from internal sources, and electrostatic coupling from external sources. The current may manifest itself as an axial flux passing down the center of the motor shaft or as an alternating flux linking the motor shaft, as examples. Bearing currents may arise whether the machine is DC or AC, and whether the machine is a large or a small horsepower motor.

Axial shaft flux is created by unbalanced ampere turns that encircle the shaft, by a broken rotor bar, by residual magnetization, or by an eccentric air gap, as examples. Alternating flux may result from asymmetrical magnetic properties of the stator or the rotor core, or from non-homogeneous steel that causes flux paths in the motor that are not symmetrical, as examples. These currents can cause premature failure of the bearings in the rotating machine by causing an electrical discharge to pass through the bearing balls and races, causing metal transfer therefrom and into the lubricant. This loss of metal leads to pitting, craters, and discontinuities in the surfaces, which leads in turn to increased bearing currents. The increased bearing currents effect tends to increase frictional heating, to increase temperature of the bearing during operation, and ultimately to cause failure of the bearing.

The increased bearing current effect can be mitigated to an extent by addressing the aforementioned drawbacks by improving material properties, component tolerances, and asymmetries of magnetic components, and the like. However, many of the electrical drives used in today's applications are Variable Speed Drives (VSDs) that involve the use of power converters that include fast switching pulse width modulation (PWM) semiconductor devices such as IGBTs and MOS-FETs. At the high frequencies of operation (up to several MHz transitions or more), capacitively coupled currents can flow through paths that may normally be considered to be electrical insulators. For instance, currents can flow through magnet wire insulation, stator slot liners, motor air gaps, bearing grease, and stator slot top sticks, as examples. As such, the increased frequencies of operation exacerbate the problem of current flow within the bearings, thus leading to early life failure. Thus, despite efforts to improve motor design and reduce the propensity for early life failure, the bearings nevertheless experience currents passing therethrough that is worsened due to high frequency operation.

Damage progression in a bearing may be indirectly monitored in order to proactively take corrective action to repair or replace the bearing prior to catastrophic failure. However, such methods typically involve the use of brushes or expensive external equipment, and such external equipment may only yield an indirect indication of bearing condition, such as acoustic noise, as an example.

Therefore, it is desirable to provide an apparatus and method of monitoring a condition of a bearing that overcomes the aforementioned drawbacks.

BRIEF DESCRIPTION OF THE INVENTION

In accordance with one aspect of the invention, an electrical motor bearing condition monitoring system includes an assembly that includes a shaft, a first bearing race coupled to the shaft, a plurality of bearing balls, and a second bearing race coupled to the first bearing race via the plurality of bearing balls. A portion of the assembly has a magnetic field encoded thereon. The monitoring system includes a magnetic field sensor positioned proximately to the magnetized assembly and configured to measure the magnetic field, and a processing unit configured to detect changes in the magnetic field via the magnetic field sensor that occur due to passage of electrical current through the bearing balls.

In accordance with another aspect of the invention, a method includes providing components of a bearing assembly, the components comprising at least one of a first bearing race, a second bearing race, and a bearing shaft, magnetically encoding at least a portion of one of the components, assembling the components of the bearing assembly together, and configuring a controller to monitor a magnetic field for disturbances in the magnetization that result from bearing currents proximate to the magnetically encoded portion during operation of the bearing assembly, and predict a failure of the bearing assembly based on the monitored magnetic field.

In accordance with another aspect of the invention, an apparatus that includes a shaft, a first bearing race coupled to the shaft, a second bearing race coupled to the shaft, and a plurality of bearing balls positioned between the first bearing race and the second bearing race. One of the shaft, a portion of the first bearing race, and a portion of the second bearing race is magnetically encoded having essentially a single direction of magnetic polarization.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 4 is an illustration of a roller bearing having an outer magnetically encoded ring according to an embodiment of the invention.

FIG. 5 is an illustration of a roller bearing having an inner magnetically encoded ring according to an embodiment of the invention.

DETAILED DESCRIPTION

A system and method are shown for monitoring a condition of a bearing in an electrical motor. However, one skilled in the art will recognize the invention is equally applicable to other rotating devices that result in electrical current passing through balls of a bearing. Thus, although the invention is described in embodiments that include an electrical motor, one skilled in the art will recognize that the invention presented herein need not be limited to an electrical motor, but may include any rotating device having bearings therein that are susceptible to bearing currents passing therethrough. Further, as will be illustrated, embodiments of the invention described herein include a ring that is magnetically encoded and coupled or otherwise attached to one or more bearing races. However, additional embodiments, as will be discussed, include races or other components that are themselves ferromagnetic materials that may be magnetically encoded, thus forgoing a separate magnetically encoded ring attached.

According to embodiments of the invention, bearing components of an electrical motor may be magnetically encoded and used to monitor a condition of a bearing in an electrical motor in order to predict failure of the bearing. As bearing currents increase during life of the bearing, the bearing currents disturb and affect the magnetization of the magnetic encoded component(s). Thus, by using historically acquired data, monitoring bearing currents via a magnetically encoded component yield a condition of a bearing that may be used to proactively replace the bearing before failure of the bearing, according to embodiments of the invention. The historically acquired data may be based on monitoring and failure data acquired in the field (i.e., in functioning units at customer sites, etc. . . . ), or may be based on monitoring and failure data acquired in test rigs in, for instance, test laboratories.

Figure 1:
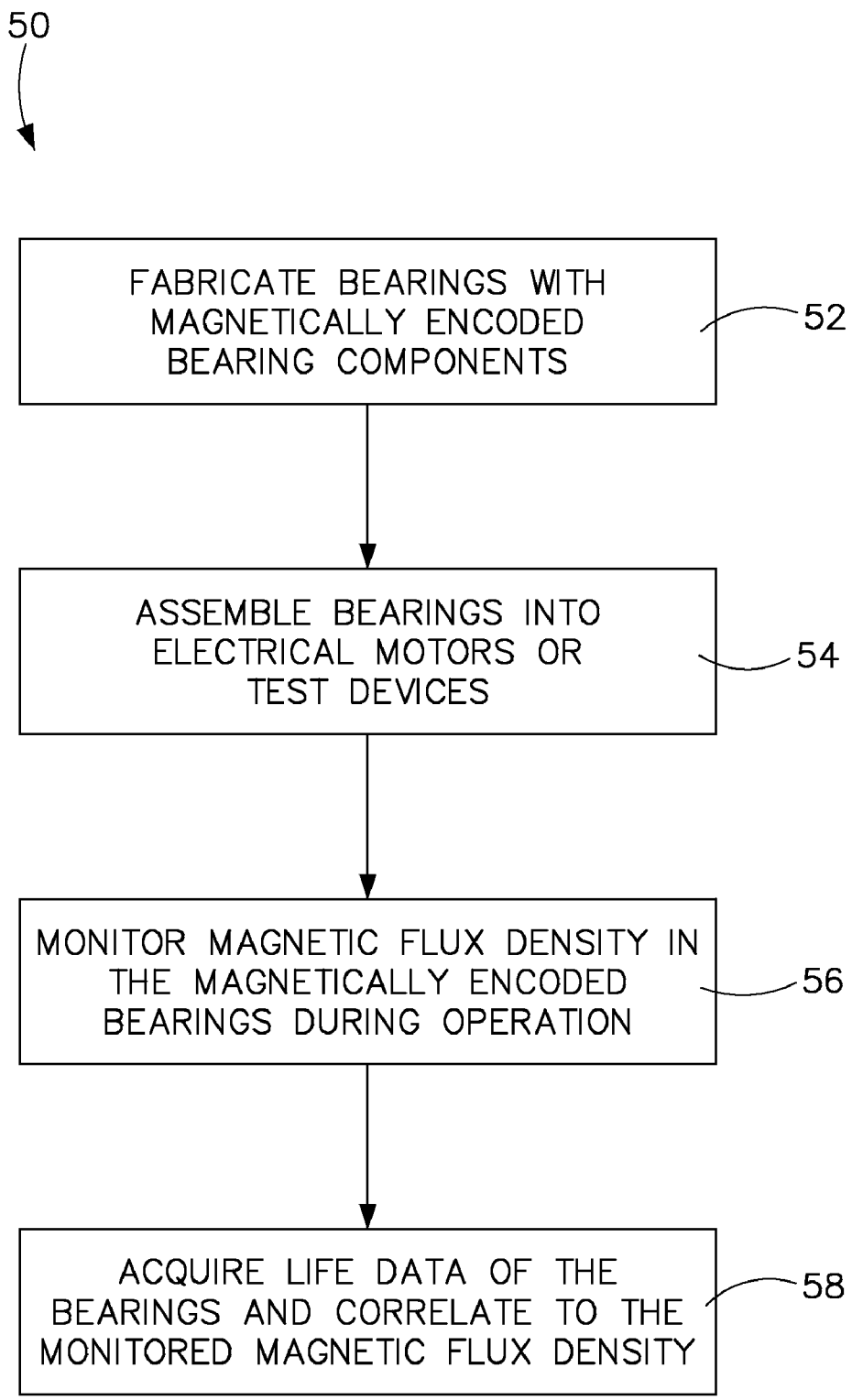
FIG. 1 illustrates a flowchart for acquiring bearing life data that incorporates embodiments of the invention.

Thus, referring to FIG. 1, a flowchart 50 illustrates a broad overview of acquisition of bearing condition data according to an embodiment of the invention. Flowchart 50 begins with fabrication of bearings at step 52, each bearing having one or more magnetically encoded bearing components and each bearing having essentially a single direction of magnetization. In embodiments of the invention, bearing component(s) are permanently encoded, which means that the bearing component(s) retain magnetization after application of a pulsed current thereto. However, one skilled in the art will recognize that such "permanent" magnetization may likewise be demagnetized as is commonly understood within the art.

The magnetically encoded bearing components may include one or more bearing races and/or a magnetically encoded bearing shaft, as will be discussed in embodiments of the invention. At step 54, the bearings are assembled into electrical motors and/or test devices, and such assembly includes placement of magnetic field sensor(s) proximately to the magnetically encoded bearing component(s). At step 56, the magnetic flux density proximate the magnetically encoded bearing component(s) is monitored and recorded during the life of the bearing. As stated, the bearings may be in devices in the "field" or may be in test rigs in laboratories, as examples. In such fashion, life data of the bearing is monitored and acquired as the bearing progresses from early life through failure. Accordingly, at step 58, a pool of bearing life data is acquired as a function of bearing current, which is a function of the field disturbance that is measured proximately to the magnetically encoded bearing component(s) via the magnetic flux density.

As such, a historical bearing life database may be assembled and continually built upon that is based on field disturbance that is a function of bearing current. Thus, as the pool of historical data builds, field disturbance proximate an encoded bearing component may be used to directly monitor a bearing condition in order to proactively predict bearing failure. As can be understood by one skilled in the art, such predictions may be based on absolute measurements of the magnetic flux density or may be based on changes in the magnetic flux density over time, as examples. Further, although it is preferable to measure the magnetic flux density in the encoded bearing component(s) in direction of the originally encoded magnetic field flux lines, additional measurement information may be yielded by measuring in two or even all three Euclidean 3-space vectors, proximately and with respect to the originally encoded magnetic field flux lines. Additionally, as will be discussed, the magnetically encoded bearing components may include multiple bearing types and multiple bearing configurations—of components and of measurement locations. Thus, for each bearing configuration and as would be understood by one skilled in the art, a historical bearing database may be generated for each unique configuration, measurement location, and measurement orientation.

Figure 2:
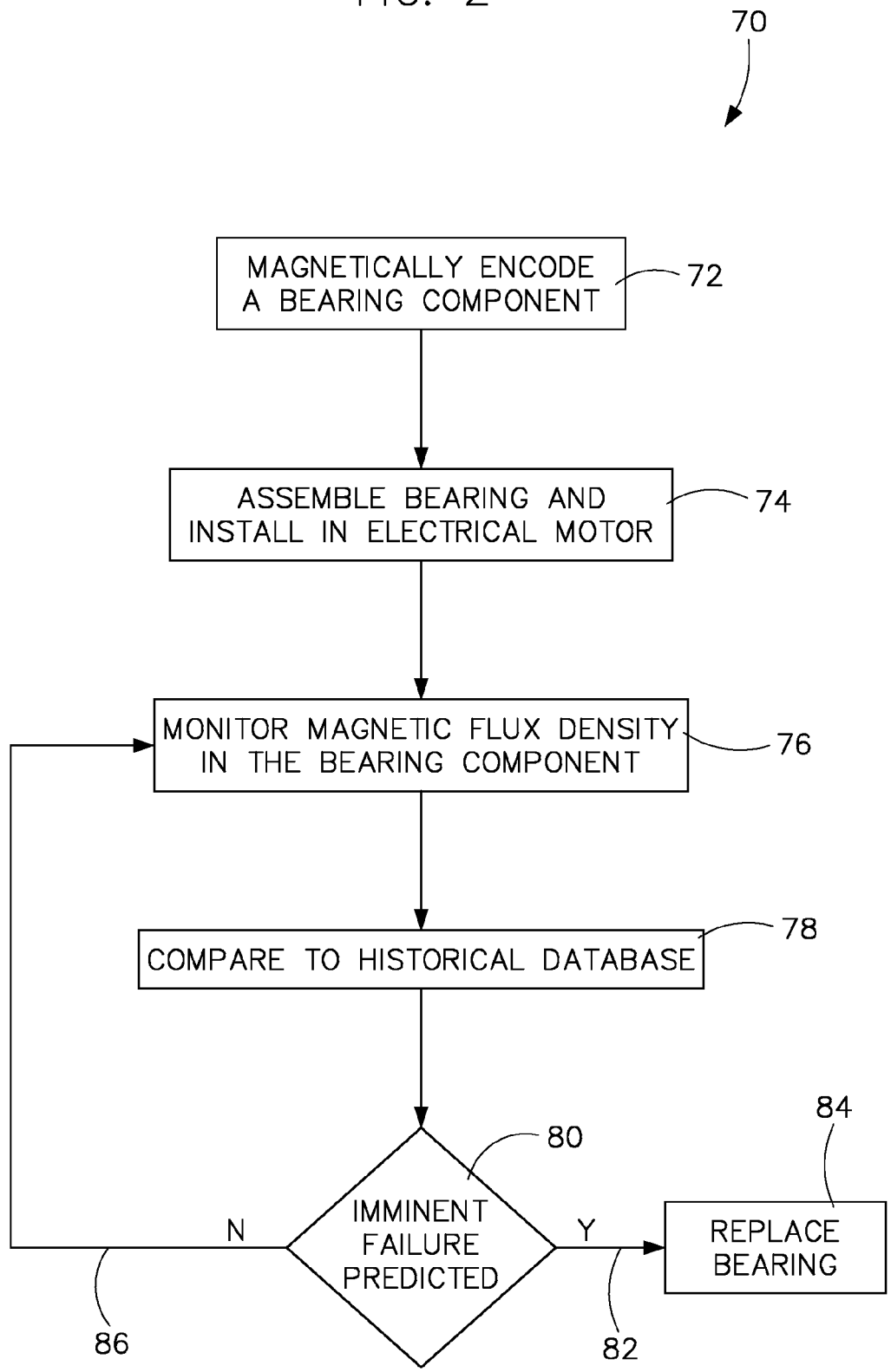
FIG. 2 illustrates a flowchart for acquiring bearing condition data that incorporates embodiments of the invention.

Referring now to FIG. 2, a process 70 includes step 72, wherein at least one bearing component is magnetically encoded having essentially a single direction of magnetic polarization according to embodiments of the invention. After encoding at step 72, a bearing is assembled at step 74 and installed into an electrical motor. Magnetic flux density in the bearing component is measured and monitored at step 76 and is compared to a historical database, such as one acquired as discussed with respect to FIG. 1, at step 78. The condition of the bearing is determined based on the historical database and based on the historical understanding that has been developed. Thus, at step 80, a prediction is made of whether the bearing is going to imminently fail or fail in the near future. Such prediction may be used to proactively replace a bearing within the electrical motor during, for instance, a scheduled maintenance period, or such prediction may be used to avoid a catastrophic bearing failure, as examples. Further, such monitoring may be local to the electrical device, or may be remotely monitored via a processing unit, via a computer, or via the Internet, as examples. Thus, if bearing failure is predicted imminently or in the near future 82, then the bearing may be proactively replaced at step 84. However, if bearing failure is not predicted 86, then the system may continue to monitor magnetic flux density in the bearing component at step 76.

Figure 3:
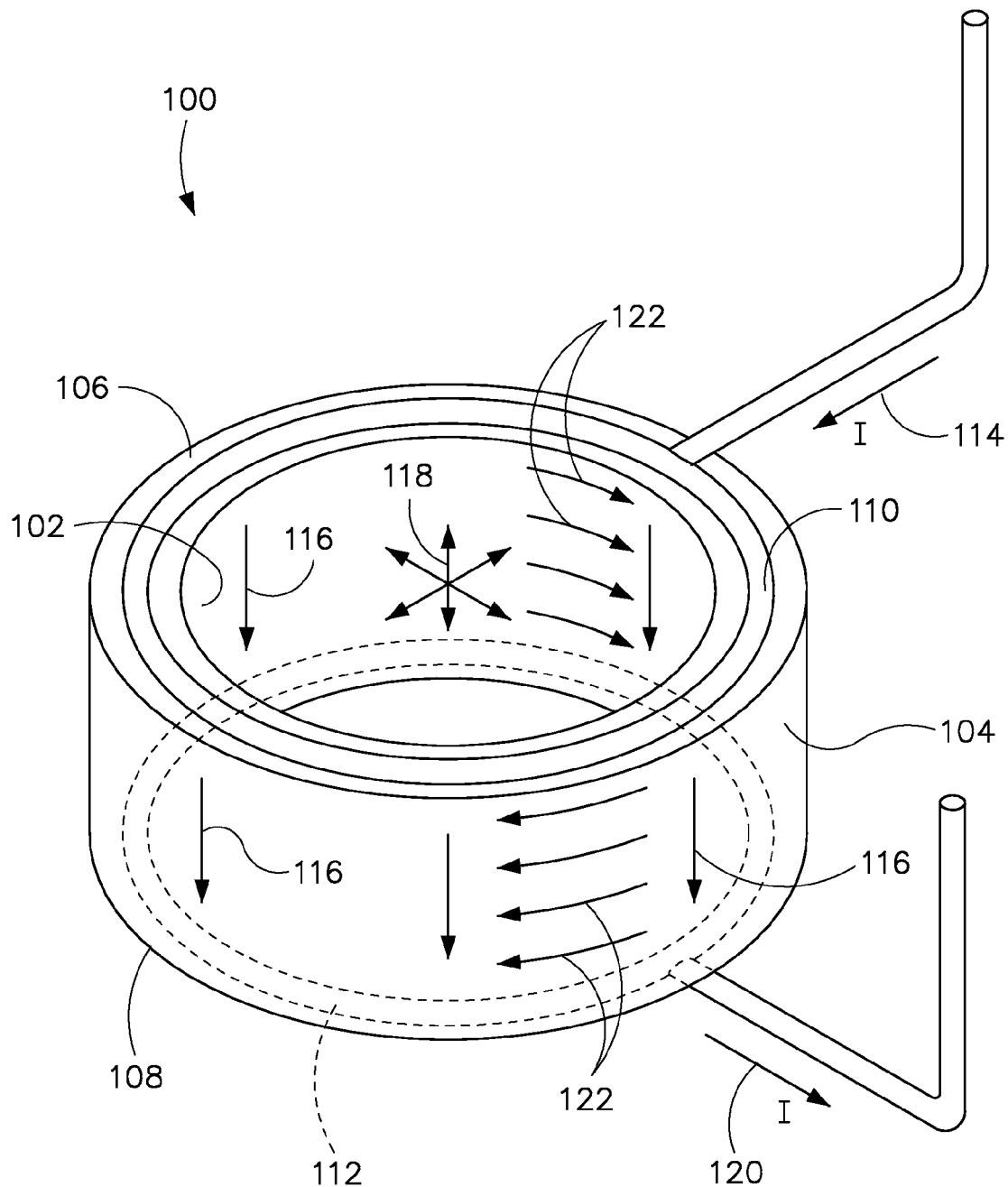
FIG. 3 illustrates a magnetically encoded ring for a roller bearing according to an embodiment of the invention.

FIG. 3 illustrates a magnetic encoding of a ring according to an embodiment of the invention. As illustrated, ring 100 is a ferromagnetic material that includes an inner surface 102 and an outer surface 104. Ring 100 includes a first axial surface 106 and a second axial surface 108. In order to magnetically encode ring 100, a first ring electrode 110 is placed in contact with first axial surface 106, and a second ring electrode 112 is placed in contact with second axial surface 108. Pulsed currents 114 are applied to the first ring electrode 110, resulting in a current density vector 116 passing through ring 100 in a substantially axial direction 118 and as a return current 120. Thus, after passing current density vector 116, parallel magnetization lines 122 result in ring 100 that are perpendicular to current density vector 116. As such, ring 100 may be magnetically encoded and used in, for instance, a roller bearing as illustrated in FIGS. 4 and 5, in order to monitor a bearing condition thereof. In the embodiments illustrated, ring 100 may be shrink fitted or otherwise attached to a bearing race in a path to ground that may be used to monitor a condition of a bearing.

Referring to FIG. 4, a roller bearing 200 is illustrated that may be used in an electrical motor (not shown) according to embodiments of the invention. Roller bearing 200 includes an inner race 202 and an outer race 204 and a plurality of bearing balls 206 positioned therebetween. Roller bearing assembly 200 includes a magnetically encoded ring 208 that is in a path to ground and is encoded in the fashion as illustrated in FIG.

3 above. Each ball contacts the races 202, 204 at respective contact points 210, 212. Thus, during operation, bearing currents pass through the bearing balls. The bearing currents disturb the magnetization in magnetically encoded ring 208, and the disturbance may be detected via a magnetic field sensor 214 positioned proximately thereto. Referring to FIG. 4, magnetic field sensor 214 is illustrated as being positioned external to and tangential or perpendicular to an outer circumference 217 of roller bearing assembly 200 to detect disturbances in magnetic field lines, such as parallel magnetization lines 122. Accordingly, magnetic field sensor 214 is positioned to detect disturbances in magnetization 122 in a direction that is tangential or perpendicular to outer circumference 217. However, as stated, additional magnetic field sensors, similar to magnetic field sensor 214, may likewise be used to detect and measure disturbances therein by orienting the additional magnetic field sensors perpendicular to the orientation of the first sensor Thus, as discussed, the disturbances may be compared to historically obtained data and may be used to monitor a condition of roller bearing assembly 200. In one embodiment magnetic field sensor 214 is connected to a signal conditioning and processing unit 215, which may be accessed via for instance a computer, and which may further be accessed remotely for monitoring a condition of roller bearing assembly 200. As the bearing balls and races age, the bearing currents likewise increase, and such increase may be measured through magnetic field disturbances proximate to a magnetized surface different than the magnetic field caused by the magnetized surface of a normally operating bearing.

Similar to FIG. 4, FIG. 5 illustrates a roller bearing 240 that may be used in an electrical motor for monitoring condition of bearing 240, according to another embodiment of the invention. Roller bearing assembly 240 includes an inner race 242 and an outer race 244 and a plurality of balls 246 positioned therebetween. Roller bearing assembly 240 includes a magnetically encoded ring 248 having an inner circumference 251 that is in a path to ground and is encoded in the fashion as illustrated in FIG. 3 above. Each ball contacts the races 242, 244 at respective contact points 250, 252. Thus, during operation, bearing currents pass through the bearing balls. Such bearing currents disturb the magnetization in magnetically encoded ring 248, and the disturbance may be detected via a magnetic field sensor 254 positioned proximately thereto. Further, as illustrated, magnetic field sensor 254 is positioned to detect magnetic field disturbances similar to that described with respect to FIG. 4 and in a direction that is tangential or perpendicular to inner circumference 251. However, as stated, additional magnetic field sensors, similar to magnetic field sensor 254, may likewise be used to detect and measure disturbances therein by orienting the additional magnetic field sensors perpendicular to the orientation of the first sensor. Thus, as discussed, the disturbances may be compared to historically obtained data and may be used to monitor a condition of roller bearing assembly 240. As the bearing balls and races age, the bearing currents likewise increase, and such increase may be measured through magnetic field disturbances proximate to a magnetized surface different than the magnetic field caused by the magnetized surface of a normally operating bearing.

The embodiments illustrated in FIGS. 4 and 5 each are illustrated having a single magnetically encoded ring therein. However, one skilled in the art will recognize that more than one magnetically encoded ring may be included within each roller bearing. Thus, according to embodiments of the invention, a roller bearing may have both an outer ring such as magnetically encoded ring 208 of FIG. 4 and an inner ring such as magnetically encoded ring 248 of FIG. 5. Accordingly, bearing condition data may be obtained in both locations and in multiple orientations at each location, thus providing additional information for monitoring a condition of a roller bearing.

Further, although magnetically encoded ring 208 of FIG. 4 and magnetically encoded ring 248 of FIG. 5 are illustrated as rings that are separate from their respective races 204, 242 to which they are coupled, embodiments of the invention include magnetization of the races themselves in lieu of providing additional rings 208, 248. In such an embodiment, the race(s) may be made of a ferromagnetic material that can be magnetically encoded and in a path to ground to enable monitoring of a bearing condition via a magnetic field sensor as discussed above. Thus, according to embodiments of the invention, the races themselves may be magnetically encoded in the fashion described with respect to FIG. 3. As such, an inner race, an outer race, or both races of a roller bearing assembly may be magnetized and monitored via a signal conditioning and processing unit 249 to provide an indication of bearing currents and a condition of the bearing.

Figure 6:
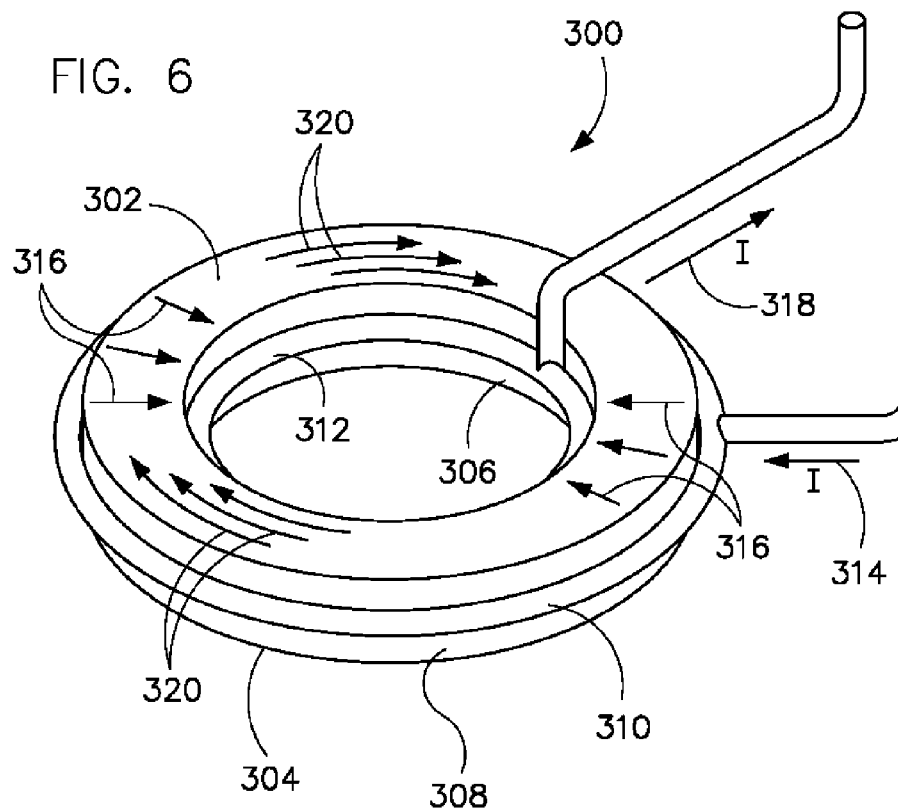
FIG. 6 illustrates a magnetically encoded ring for a thrust bearing according to an embodiment of the invention.
Figure 7:
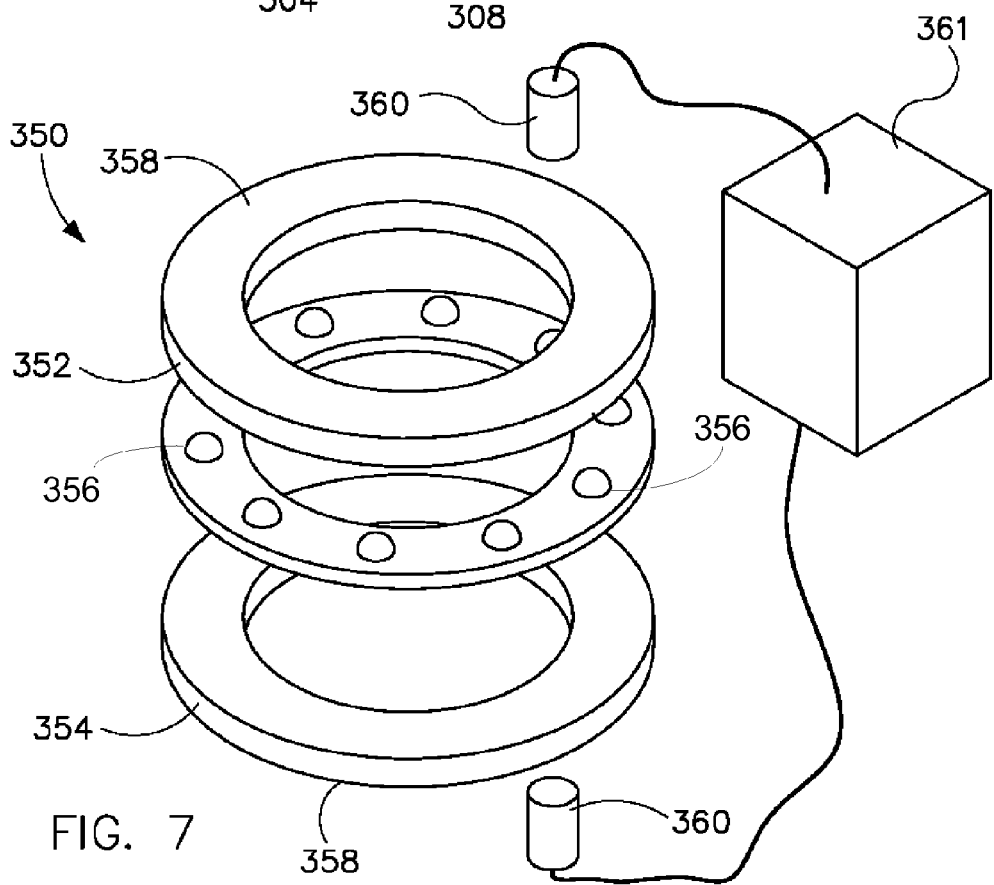
FIG. 7 is an illustration of a thrust bearing having an encoded ring according to an embodiment of the invention.

Bearing configurations need not be limited to a roller bearing assembly, but may include other bearing configurations such as a thrust bearing. Thus, in another embodiment of the invention, FIGS. 6 and 7 illustrate a thrust bearing according to embodiments of the invention. A ring may be magnetically encoded in an analogous fashion to the ring encoded as discussed with respect to FIG. 3. However, because the balls and races in a thrust bearing have an orientation that is different from that of a roller bearing, the ring is encoded to have a magnetic polarization that is oriented at an angle of 90° with respect to that illustrated in FIG. 3.

Thus, referring to FIG. 6, a ferromagnetic ring 300 for use in a thrust bearing includes a first axial surface 302 and a second axial surface 304, as well as an inner surface 306 and an outer surface 308. In order to magnetically encode ring 300, a first ring electrode 310 is placed in contact with outer surface 308, and a second ring electrode 312 is placed in contact with inner surface 306 of ring 300. Pulsed currents 314 are applied to first ring electrode 310, resulting in a current density vector 316 passing through ring 300 in a substantially radial direction and as a return current 318. Thus, after passing current density vector 316, a magnetization 320 having generally parallel lines results therein having a single polarization. As such, ring 300 may be encoded and used in, for instance, a thrust bearing as illustrated in FIG. 7 in order to monitor a bearing condition thereof. As with the embodiments illustrated in FIGS. 4 and 5, such monitoring may be in one, two, or all three orientations with respect to the lines of magnetization 320. In the embodiments illustrated, ring 300 may be mechanically attached to a bearing race in a path to ground that may be used to monitor a condition of a bearing.

Referring to FIG. 7, a thrust bearing 350 is shown that may be used in an electrical motor (not shown) according to embodiments of the invention. Thrust bearing 350 includes a first thrust bearing race 352 and a second thrust bearing race 354 and a plurality of bearing balls 356 positioned therebetween. Thrust bearing 350 includes one or more magnetically encoded rings 358 that are in a path to ground and are each encoded in the fashion as discussed above with respect to FIG. 6. Each ball 356 contacts the thrust bearing races 352, 354 at respective contact points (not shown). Thus, during operation bearing currents pass through bearing balls 356. Such bearing currents disturb the magnetic field in the one or more magnetically encoded rings 358, and the disturbance may be detected via respective magnetic field sensors 360 positioned proximate thereto and monitored via a signal conditioning and processing unit 361. Thus, as discussed, the disturbances may be compared to historically obtained data and may be used to monitor a condition of thrust bearing 350. As the bearing balls and races age, the bearing currents likewise increase, and such increase may be measured through magnetic field disturbances proximate to a magnetized surface different than the magnetic field caused by the magnetized surface of a normally operating bearing.

In addition and as discussed with respect to embodiments of the roller bearing above, thrust bearing 350 may be fabricated having rings 352, 354 that are themselves fabricated (one or both) of a ferromagnetic material and encoded in lieu of using separate rings 358. Thus, in such an embodiment, rings 352, 354 are encoded, and the bearing currents are monitored therein using magnetic field sensors 360 as discussed above.

Figure 8:
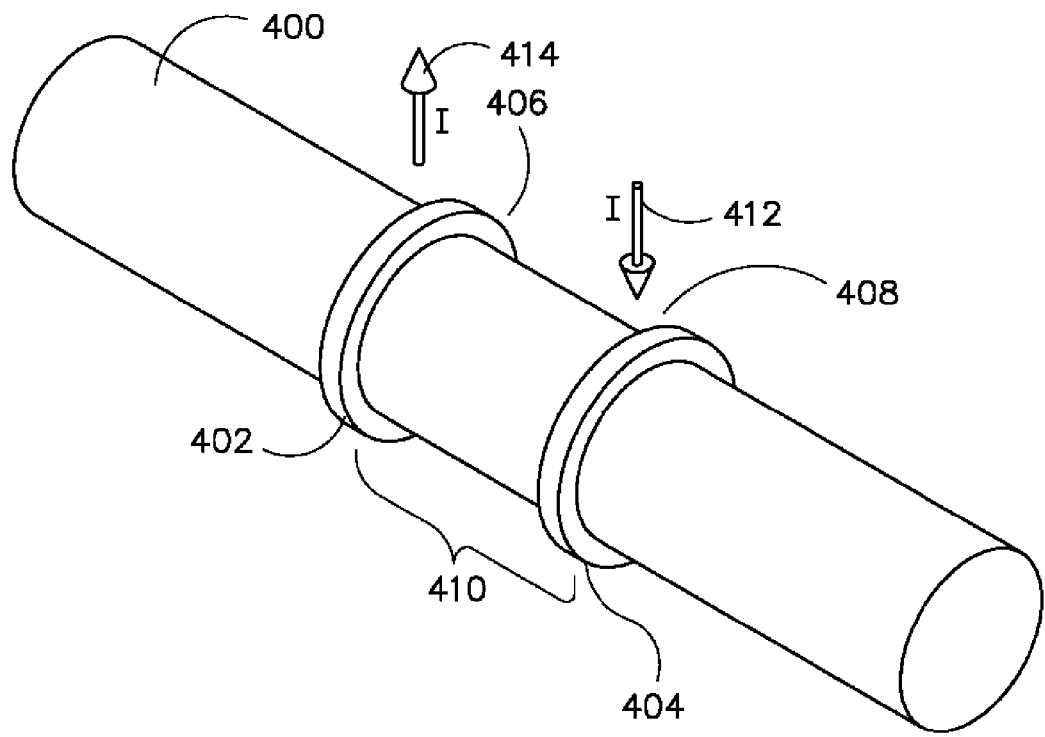
FIG. 8 illustrates a magnetically encoded shaft according to an embodiment of the invention.

In embodiments of the invention, a ferromagnetic shaft for an electrical motor may be magnetically encoded instead of the bearings themselves, and the shaft field disturbance may be monitored to monitor a bearing condition. Referring now to FIG. 8, a shaft 400 includes two Shaft Processing Holding Clamps (SPHCs) 402, 404 that are placed at respective borders 406, 408 of a planned sensing encoding region 410 over which a bearing, such as a roller bearing (not shown), may be placed. In this embodiment, a pulsed electrical current may enter 412 the shaft at SPHC 404 and may exit 414 the shaft at SPHC 402. Region 410 will thus become a uniformly encoded region having a essentially a single direction of magnetic polarization that may be used for bearing current monitoring according to this embodiment. Further, a depth of magnetization in shaft 400 may be controlled by controlling a frequency and duration of the applied pulses. Thus, by applying short current pulses, a high current density will develop in an outermost layer of shaft 400, and by magnetizing only the outermost layer, a high current density can be achieved without having to apply large currents thereto.

Figure 9:
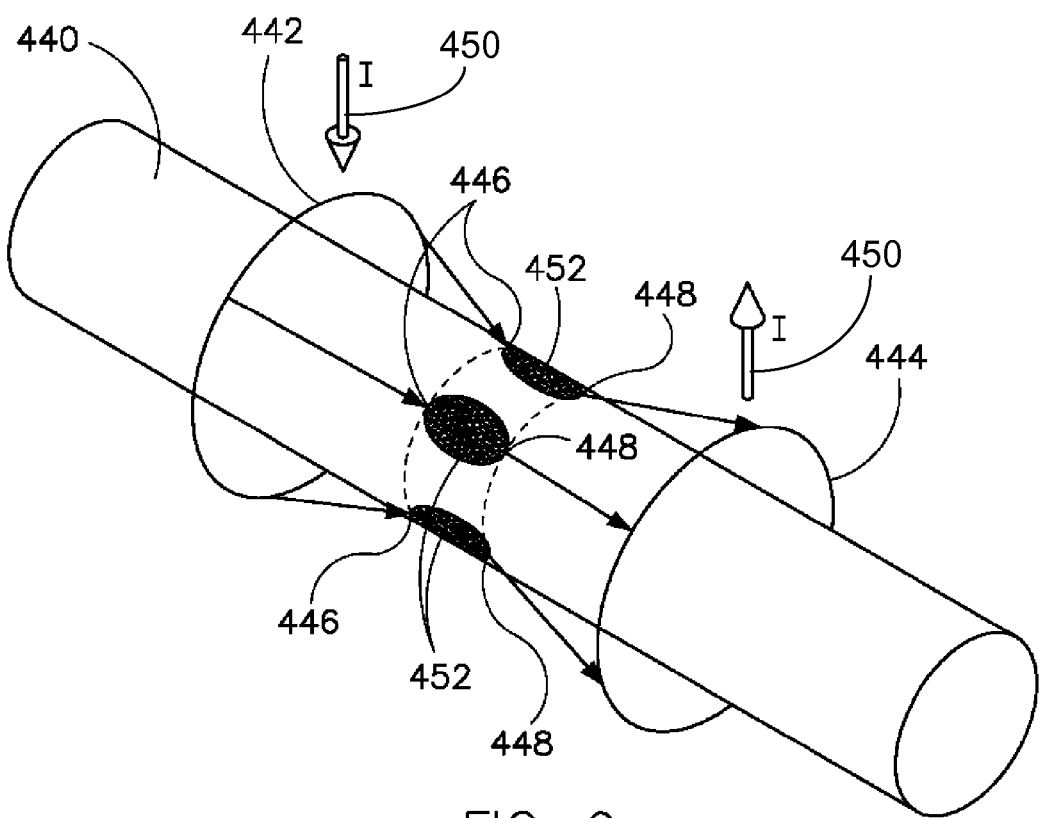
FIG. 9 illustrates a magnetically encoded shaft according to an embodiment of the invention.

Referring now to FIG. 9, a shaft 440 may be magnetically encoded in sections according to another embodiment of the invention. If electrodes are installed at sufficient distance from the bearing, then the bearing section can be magnetically encoded with sufficient uniformity and having essentially a single direction of magnetic polarization. Thus, when a spacing between individual circumferentially placed current entry points are relatively large in relation to a diameter of the shaft (and equally large are the spacings between the circumferentially placed current exit points), then a poor rotational signal uniformity results. In such a case, the length of the pulsed current encoded segment has to be as large as possible, otherwise the created magnetic field may be circumferentially non-uniform. According to this embodiment, if a pulsed current encoded segment is long enough, then a uniform current distribution is achieved that generates the essentially single direction of magnetic polarization.

Thus, according to this embodiment, shaft 440 includes a first electrode 442 and a second electrode 444 and electrical input contact points 446 that are electrically connected to first electrode 442. Likewise, electrical output contact points 448 are electrically connected to second electrode 444. Thus, when a pulsed current 450 is applied to first electrode 442, the pulsed current is caused to pass to shaft 440 through electrical contact points 446 and to exit through electrical output contact points 448 and to second electrode 444. As such, according to this embodiment, a plurality of magnetically encoded regions 452, each having a substantially uniform magnetic flux therein and each having a single and uniform polarization, may be generated in shaft 440. As such, a bearing condition may be monitored therewith by monitoring disturbances in the magnetic flux density proximate thereto.

Accordingly, a shaft may be magnetically encoded according to embodiments of the invention, as shown in exemplary illustrations in FIGS. 8 and 9. Thus, after magnetization, bearing currents may be monitored therein as discussed herein, and the condition of a bearing positioned about the encoded shaft may likewise be inferred based on historically obtained data. As such, the life of the bearing may be, likewise, monitored and the bearing proactively replaced during operation of an electrical machine in which it is placed.

One skilled in the art will recognize that the embodiments illustrated herein are but examples, and that the invention may be applicable to any motor configuration having bearings that are susceptible to bearing currents. Thus, by magnetically encoding a component of the bearing to have a magnetic flux density that is perpendicular to a current density passing through the bearing balls, a condition of the bearing may be monitored and, based on historically obtained data, used to predict bearing life and failure thereof.

In the embodiments illustrated, magnetic field sensors are illustrated as positioned proximate the encoded component (e.g., encoded ring 208 of FIG. 4). In embodiments of the invention it is desirable to position the sensor(s) between 0 and 10 mm, preferably not more than 5 mm distant therefrom. Further, in the embodiments illustrated, mapping of the magnetic fields may be conducted while the system with components is being assembled. In embodiments of the invention, the magnetic field sensors may be passive components that may be embedded within components. As an example, FIG. 5 illustrates magnetic field sensor 254 positioned internal to inner circumference 251. However, such an embodiment may include a shaft (not shown) positioned therein and in contact with inner circumference 251. As such, in such an embodiment magnetic field sensor 254 may be embedded within the shaft and periodically monitored for detection of bearing currents. In embodiments of the invention, magnetic sensing may be done while a rotor-shaft system is partially or fully disassembled. Accordingly, a system in which one or more such sensors are used, the system may be partially or fully disassembled and the sensor, such as magnetic field sensor 254, may be connected to processing unit 249 to ascertain a condition of the bearing. In embodiments of the invention having embedded sensors, a plug for wiring may be provided that is used for periods of ascertaining a condition of a bearing. In this embodiment the bearing may be operated during normal operation and without continuous monitoring of a bearing condition. Then, during periods of condition monitoring, the system may be disassembled and the plug attached to a processing unit in order to measure and determine a condition thereof Further, in the case of large bearings or large shafts (e.g., wind turbine applications), an entire shaft or bearing component need not be magnetically encoded. Thus, referring back to FIG. 3 as an example, although each electrode 110, 112 is illustrating as covering an entire 360° circumference of ring 100, it is possible to magnetically encode only a portion of the circumference of ring 100, so long as the electrodes encompass substantially the same area of ring 100 and are substantially opposite to one another. The amount or portion of the circumference may be selected based on the magnitude of the relevant bearing currents. Thus, if there are relevant bearing currents of sufficient magnitude, they will occur in the limited circumferential portion of the ring itself. Accordingly, a sectional encoding includes less technical effort than for a full encoding, simplifying the fabrication costs by reducing the necessary encoding current, as an example. For large shaft/ bearing designs, a sectional encoding can be applied at lower cost and can be used in the same fashion to detect bearing currents through magnetic inspection.

A technical contribution for the disclosed method and apparatus is that it provides for a computer implemented system and method of monitoring a condition of a bearing.

According to one embodiment of the invention, an electrical motor bearing condition monitoring system includes an assembly that includes a shaft, a first bearing race coupled to the shaft, a plurality of bearing balls, and a second bearing race coupled to the first bearing race via the plurality of bearing balls. A portion of the assembly has a magnetic field encoded thereon. The monitoring system includes a magnetic field sensor positioned proximately to the magnetized assembly and configured to measure the magnetic field, and a processing unit configured to detect changes in the magnetic field via the magnetic field sensor that occur due to passage of electrical current through the bearing balls.

In accordance with another embodiment of the invention, a method includes providing components of a bearing assembly, the components comprising at least one of a first bearing race, a second bearing race, and a bearing shaft, magnetically encoding at least a portion of one of the components, assembling the components of the bearing assembly together, and configuring a controller to monitor a magnetic field for disturbances in the magnetization that result from bearing currents proximate to the magnetically encoded portion during operation of the bearing assembly, and predict a failure of the bearing assembly based on the monitored magnetic field.

Another embodiment of the invention includes an apparatus that includes a shaft, a first bearing race coupled to the shaft, a second bearing race coupled to the shaft, and a plurality of bearing balls positioned between the first bearing race and the second bearing race. One of the shaft, a portion of the first bearing race, and a portion of the second bearing race is magnetically encoded having essentially a single direction of magnetic polarization.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electrical motor bearing condition monitoring system comprising:
   bearing components comprising:
      a shaft;
      a first bearing race coupled to the shaft;
      a plurality of bearing balls;
      a second bearing race coupled to the first bearing race via the plurality of bearing balls;
   wherein a material of one of the shaft, the first bearing race, and the second bearing race is magnetically encoded having a retained magnetization;
   a magnetic field sensor positioned proximately to the magnetically encoded component and configured to measure the magnetic field; and
   a processing unit configured to detect changes in the magnetically encoded component via the magnetic field sensor to predict a failure of the electrical motor bearing based on the changes in the magnetically encoded component.

2. The system of claim 1 wherein the magnetic encoding is permanently encoded.

3. The system of claim 1 wherein the magnetic field sensor is positioned perpendicularly with respect to a surface having generally parallel magnetic flux field lines of the magnetization.

4. The system of claim 1 wherein the magnetic field sensor is positioned tangential with respect to a surface having generally parallel magnetic flux field lines of the magnetization.

5. The system of claim 1 wherein the magnetization is polarized essentially in only one direction.

6. The system of claim 1 wherein the changes that occur are detected due to a passage of electrical current through the bearing balls, wherein the magnetic field is substantially perpendicular to a current density vector of the electrical current.

7. The system of claim 1 wherein the first bearing race comprises an inner bearing race, wherein the second bearing race comprises an outer bearing race, and wherein the plurality of bearing balls are positioned radially between the inner bearing race and the outer bearing race.

8. The system of claim 7 wherein the assembly further comprises a magnetically encoded ring attached to one of the outer bearing race and the inner bearing race, wherein the magnetically encoded ring comprises the portion of the assembly having the magnetic field permanently encoded thereon.

9. The system of claim 1 wherein the first bearing race comprises a first thrust bearing race and the second bearing race comprises a second thrust bearing race, wherein the bearing balls are positioned axially between the first thrust bearing race and the second thrust bearing race.

10. The system of claim 9 comprising a magnetically encoded ring attached to one of the first thrust bearing race and the second thrust bearing race, wherein the magnetically encoded ring comprises the portion of the assembly having the magnetic field permanently encoded thereon.

11. A method comprising:
   providing components of a bearing assembly, the components comprising at least one of a first bearing race, a second bearing race, and a bearing shaft;
   magnetically encoding at least a portion of one of the components, wherein magnetically encoding the portion of the component comprises attaching a first electrode and a second electrode to the portion and passing an electrical current through the portion via the first and second electrodes;
   assembling the components of the bearing assembly together; and
   configuring a controller to:
      monitor a magnetic field for disturbances in the magnetization that result from bearing currents proximate to the magnetically encoded portion during operation of the bearing assembly; and
      predict a failure of the bearing assembly based on the monitored magnetic field.

12. The method of claim 11 wherein configuring the controller further comprises configuring the controller to predict failure of the bearing assembly by comparing the monitored field disturbances to previously obtained bearing life data that has been correlated to previously obtained magnetic field disturbance data.

13. The method of claim 11 wherein configuring the controller further comprises configuring the controller to monitor the magnetic field for field disturbances in all three vectors of Euclidean 3-space.

14. The method of claim 11 wherein the magnetically encoded component consists of essentially a single direction of magnetic polarization.

15. The method of claim 11 wherein the first bearing race comprises one of an inner bearing race, an outer bearing race, and a thrust bearing race.

16. The method of claim 11 further comprising positioning a magnetic field sensor to detect the field disturbances in the magnetic field of the magnetically encoded portion.

17. The method of claim 16 wherein monitoring the magnetic field further comprises:
   extracting an electrical signal from the magnetic field sensor; and
   passing the electrical signal through a signal conditioning unit.

18. An apparatus comprising:
   a shaft;
   a first bearing race coupled to the shaft;
   a second bearing race coupled to the shaft; and
   a plurality of bearing balls positioned between the first bearing race and the second bearing race;
   wherein one of the shaft, a portion of the first bearing race, and a portion of the second bearing race is magnetically encoded having essentially a single direction of magnetic polarization.

19. The apparatus of claim 18 wherein the magnetically encoded one of the shaft, the portion of the first bearing race, and the portion of the second bearing race is permanently encoded.

20. The apparatus of claim 18 further comprising:
   a magnetic field sensor positioned proximately to the magnetic polarization of the one of the shaft, the portion of the first race, and the portion of the second race;
   a processing unit configured to:
      detect disturbances in the magnetic polarization that occur due to passage of bearing currents through the apparatus; and
      predict failure of the apparatus based on previously acquired life data that has been correlated to magnetic field disturbance data.

21. The apparatus of claim 18 wherein the first bearing race comprises an inner race of a roller bearing, wherein the second bearing race comprises an outer race of the roller bearing, and wherein each of the plurality of balls is positioned radially between the inner race and the outer race.

22. The apparatus of claim 18 wherein the first bearing race comprises a first race of a thrust bearing, wherein the second bearing race comprises a second race of the thrust bearing, and wherein each of the plurality of balls is positioned axially between the first race of the thrust bearing and the second race of the thrust bearing.

23. The apparatus of claim 18 comprising a magnetically encoded ring, wherein the magnetically encoded ring comprises one of the portion of the first bearing race and the portion of the second bearing race that is magnetically encoded having essentially a single direction of magnetic polarization.

24. The apparatus of claim 18 wherein:
   each ball of the plurality of bearing balls is positioned to contact the first bearing race at a first location and to contact the second bearing race at a second location that is diametrically opposed from the first location; and
   the magnetic encoding includes a magnetic flux field having a flux density that is perpendicular to the diametrically opposed contact points of each ball.

25. The apparatus of claim 18 wherein the magnetic encoding of the one of the shaft, the portion of the first bearing race, and the portion of the second bearing race comprises the material of the one of the shaft, the portion of the first bearing race, and the portion of the second bearing race.

* * * * *